Dec. 17, 1957　　　R. V. RICE　　　2,817,023
AUTOMATIC PARALLELING RELAY
Filed June 29, 1955

United States Patent Office 2,817,023
Patented Dec. 17, 1957

2,817,023
AUTOMATIC PARALLELING RELAY

Raymond V. Rice, Lima, Ohio, assignor to Westinghouse Electric Corporation, East Pittsburgh, Pa., a corporation of Pennsylvania Application June 29, 1955, Serial No. 518,780

10 Claims. (Cl. 307—87)

The present invention relates to automatic paralleling or synchronizing of alternating current generators, and more particularly to an automatic paralleling relay for controlling the connection of an alternating current generator to an energized line for operation in parallel with one or more other generators.

When an alternating current generator is to be operated in parallel with one or more other generators, the generators must be close to synchronism with each other when they are connected together or to a common bus, so that the incoming generator will synchronize with the other generator or generators and operate properly in parallel. This means that the voltages, frequencies and phase angles of the generators, or of the incoming generator and the bus, must be the same or within predetermined limits, and the phase sequences must be the same.

In many automatic synchronizing systems, the synchronizing system itself includes means for automatically adjusting the voltage, frequency and phase angle of the incoming generator until they are within the required limits, and the circuit breaker is then closed at the proper instant to connect the incoming generator to the line. Such a system is relatively complicated because of the generator control means which it necessarily includes. Another approach to the problem of synchronizing is possible, however, where the generators themselves are provided with control means or systems which maintain the voltage and frequency sufficiently close to the desired values. Paralleling can then be effected by means of a relay which responds to the difference in voltage, frequency and phase angle between the incoming generator and the bus, and causes closing of the breaker at the proper instant when these quantities are sufficiently close. Such a system is particularly desirable for aircraft use because a relatively simple relay of small size and weight can be utilized.

The principal object of the present invention is to provide an automatic paralleling relay for controlling the connection of an alternating current generator to an energized line for operation in parallel with one or more other generators.

Another object of the invention is to provide an automatic paralleling relay which responds to the difference in voltage, frequency and phase angle between an alternating current generator and an energized line, and which actuates its contacts when the differences of these quantities are within predetermined limits.

A further object of the invention is to provide an automatic paralleling relay which actuates its contacts when the voltage, frequency and phase angle differences between an alternating current generator and an energized line are within predetermined limits, and which will not operate if the phase sequence of the generator is incorrect or if there is an open phase lead from either the generator or the line.

Other objects and advantages of the invention will be apparent from the following detailed description, taken in connection with the accompanying drawing, in which.

Figure 1:
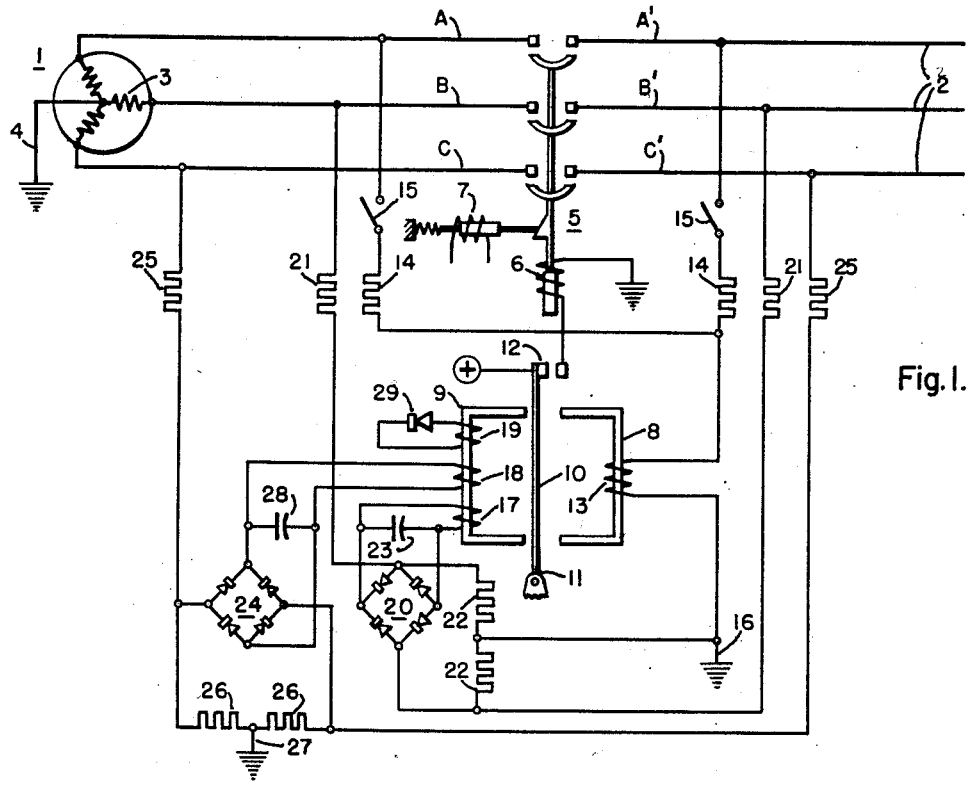
Figure 1 is a schematic diagram showing one embodiment of the invention.

The invention is shown in the drawing embodied in a relay for controlling the connection of an alternating current generator 1 to an energized three-phase line 2. The line 2 may be considered as representing the leads of another generator which with the generator 1 is to operate in parallel, or it may be a line or bus to which one or more generators are connected with which the generator 1 is to be paralleled. The generator 1 may be of any suitable type and is shown as having three-phase windings 3, connected in Y with the neutral point grounded at 4. Corresponding phase leads of the generator 1 and the line 2 are designated A, B, C, and A', B', C', respectively.

It is to be understood that the generator 1 is provided with a voltage regulator, or other voltage control means, of any suitable or usual type, and that the speed of its prime mover is suitably regulated, so that the voltage and frequency are maintained substantially constant, or within predetermined limits. The generator 1 is connected to the line 2 by means of a circuit breaker 5, of any suitable type, provided with a closing coil 6 and a trip coil 7 which may be controlled manually or automatically in any desired manner. The closing coil 6 is controlled by the paralleling relay of the present invention, as hereinafter described, and, if desired, any additional automatic or manual means may be provided for controlling the circuit breaker 5.

The paralleling relay itself is shown as having two magnetic core structures 8 and 9 which may be of any suitable physical construction and which are disposed to provide an air gap between them. A movable armature member 10 is disposed in the air gap between the two cores 8 and 9 for cooperation with both cores, and the armature is preferably positioned so that in its non-actuated position, shown schematically in the drawing, the air gap between the armature 10 and the core 8 is considerably greater than the air gap between the armature 10 and the core 9. The relation of the lengths of these air gaps is not critical and they may vary over a considerable range, but the preferred ratio of the two air gaps is of the order of 6:1.

The armature member 10 is movably mounted in any suitable manner, and is shown as being pivoted at 11 for movement toward and away from the core 8. Contact means 12 are provided at the opposite end of the armature 10 for actuation by the armature when it is moved toward the core 8. In the particular embodiment shown in the drawing, the contacts 12 are connected directly in series in an energizing circuit for the breaker closing coil 6, so that the breaker is actuated to closed position when the contacts 12 are closed by actuation of the armature member 10. It will be understood, however, that any suitable contact arrangement may be used, and the contacts may be connected in any desired manner for controlling the closing coil 6.

An operating coil 13 is placed on the core 8 of the relay to cause the armature 10 to move toward the core 8 to actuate the contacts 12 when the coil 13 is sufficiently energized. One end of the coil 13 is connected to phase A of the generator 1 and also to phase A' of the line 2, preferably through resistors 14 to reduce the voltage applied to the coil. A two-pole switch 15 is preferably also connected in series with the coil 13, as shown. The other end of the coil 13 is connected to ground at 16. It will be seen that the coil 13 is thus simultaneously connected across corresponding phase voltages of the generator 1 and of the line 2, so that these voltages are superimposed in the coil and the coil is energized in response to the sum of corresponding voltages of the generator and of the line. The resultant voltage applied to the coil 13, therefore, has a frequency equal to the mean frequency of the generator and the line and pulsates at a frequency equal to the frequency difference between the generator and the line. The voltage applied to the coil 13 has its maximum value when the voltages of the generator and of the line are in phase with each other, and has its minimum value when these voltages are 180° out of phase. Thus, the coil 13 will tend to actuate the armature 10 to close the contacts 12 when the voltages of the generator and of the line are in phase with each other.

Restraining coils 17, 18 and 19 are placed on the core 9 of the relay to provide a restraining force on the armature 10 which opposes actuation of the armature by the operating coil 13. The coil 17 is connected across the direct current output terminals of a full-wave rectifier bridge 20. The input terminals of the rectifier bridge 20 are connected to phase B of the generator 1 and to phase B' of the line 2, respectively, preferably through resistors 21, as shown, so that the rectifier bridge 20 is energized by the difference of corresponding phase voltages of the generator and of the line. Two resistors 22 are connected across the input side of the rectifier bridge 20 and the midpoint between the two resistors is connected to ground at 16. A capacitor 23 is preferably connected across the coil 17.

The restraining coil 18 is similarly connected to a rectifier bridge 24 which has its alternating current input terminals connected to the corresponding phases C and C' of the generator 1 and of the line 2, respectively, through resistors 25. Two resistors 26 are connected across the input side of the rectifier 24 with the midpoint grounded at 27, and a capacitor 28 is connected across the coil 18.

It will be seen that the restraining coils 17 and 18 are each energized by a direct current voltage which is proportional to the difference between corresponding phase voltages of the generator and of the line. Thus, a pulsating direct current flows in each of these coils, and the voltage applied to each of the restraining coils 17 and 18 is a maximum when the corresponding phase voltages of the generator and the line are 180° out of phase, and a minimum when these voltages are in phase. Thus, these coils tend to prevent operation of the relay unless the generator and line voltages are in phase. It will also be seen that the voltages applied to the restraining coils 17 and 18 depend on the relative magnitudes of the generator and line voltages and decrease as these voltages approach equality.

The restraining coil 19 is short-circuited, with a blocking rectifier 29 in series with the coil. Since the currents in the coils 17 and 18 are pulsating, the flux in the core 9 pulsates correspondingly. When the flux in the core is decreasing, a voltage is induced in the short-circuited coil 19 which tends to oppose the decrease in flux, and the rectifier 29 permits a corresponding current to flow in the coil. When the flux in the core 9 is increasing, an opposite voltage is, of course, induced in the coil 19 but the rectifier 29 prevents current flow.

The rate of change of the flux in the core 9 depends on the frequency difference between the generator 1 and the line 2, since this determines the frequency of pulsation of the currents in the restraining coils 17 and 18. As the frequency difference between the generator and the line increases, the rate of change of the flux increases, so that a larger voltage is induced in the coil 19 and a larger current flows in the coil. Thus, the restraining force of the coil 19 increases as the frequency difference between the generator and the line increases, and the coil 19 prevents operation of the relay if the frequency difference between the generator and the line exceeds the desired limit. If desired, an adjustable resistance might be connected in series with the coil 19 to permit adjustment of the maximum frequency difference at which the relay will operate.

In operation, when it is desired to connect the generator 1 to the line 2, the switch 15 is closed. This connects the operating coil 13 of the relay to the generator and to the line so that it is energized by a resultant voltage proportional to the sum of corresponding phase voltages of the line and of the generator, as explained above. The closing force applied to the armature 10 will be a maximum when the generator and line voltages are in phase, and the coil 13 will thus tend to cause operation of the relay to close the contacts 12 when these voltages are in phase, or are close to being in phase.

The restraining coils 17 and 18, however, tend to oppose operation of the relay, the opposing force being a maximum when the voltages of the generator and line are 180° out of phase and a minimum when these voltages are in phase, as explained above. Since these coils act on the armature 10 through a relatively small air gap, as compared to the air gap through which the coil 13 acts, a very small holding force is sufficient to prevent operation of the relay, even when the energization of the coil 13 is such that it produces more than enough force to move the armature 10. The force of the restraining coils 17 and 18 varies very rapidly through the in-phase point of the line and generator voltages, and since a relatively small force will prevent operation of the relay, it can be made to operate very accurately within a relatively narrow range of phase angle difference. The restraining force of the coils 17 and 18 is also a function of the voltage difference between the line and generator, and the relay is prevented from operating if this voltage difference is greater than a predetermined amount.

The restraining coil 19 prevents operation of the relay if the frequency difference between the generator and the line is too great, as explained above. It will be noted that the maximum frequency difference permitted in this way is independent of any external voltages, since it is determined only by the rate of change of the flux in the core 9. The relay is very accurate, since the restraining coils permit operation only when the voltage, frequency and phase angle differences between the generator and line are within predetermined limits, which can be made as small as desired.

The relay shown in Fig. 1 will not operate if the phase sequence of the generator 1 is incorrect, that is, if it differs from that of the line 2, or if there is a broken phase lead from either the generator 1 or the line 2. If the phase sequence of the generator 1 is incorrect, the voltages to which one or both of the restraining coils 17 and 18 respond will always be 120° apart, and the difference of these voltages will always be great enough to provide a relatively large restraining force, so that the relay is prevented from operating. If either of the phase leads A or A' is open, the operating coil 13 is energized only by the voltage of the corresponding good phase and is not sufficiently energized to effect operation of the relay. If either of the phase leads B or B' is open, the rectifier 20 is connected between the corresponding good phase lead and ground at 16, so that a substantially constant voltage of considerable magnitude is applied to the restraining coil 17, preventing operation of the relay. Similarly, if either of the phase leads C or C' is open, the rectifier 24 is connected across the corresponding good phase and ground at 27, so that a constant restraining force is supplied by the coil 18. Thus, operation of the relay is prevented if any phase lead is open.

It will be seen, therefore, that an automatic paralleling relay has been provided which is of relatively simple construction and which can be made small in size and light in weight so as to be very suitable for aircraft use, although its usefulness is, of course, not restricted to any specific application. The relay can be made very accurate, however, because its operation is determined by the opposing forces of the operating coil 13 and the restraining coils 17, 18 and 19, which operate through a smaller air gap, so that their effect is relatively greater than that of the operating coil 13. Thus, the relay can be designed and adjusted to accurately close its contacts 12, to effect closing of the circuit breaker 5, at the instant when the voltage, frequency and phase angle differences between the generator 1 and line 2 are within predetermined limits.

Figure 2:
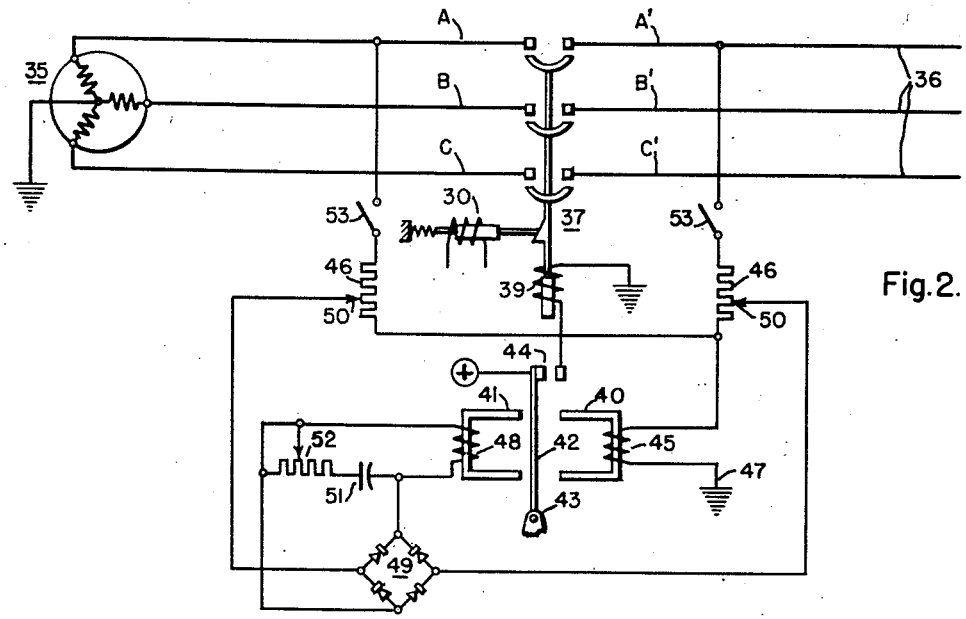
Fig. 2 is a similar diagram showing a simplified embodiment of the invention.

A somewhat simplified embodiment of the invention is shown in Fig. 2. In this embodiment, the generator 35 and line 36 may be similar to the generator 1 and line 2 described above, and the generator 35 is connected to the line 36 by a circuit breaker 37 provided with a trip coil 38 and closing coil 39. The relay itself has two magnetic core structures 40 and 41 with a movable armature 42 disposed in an air gap between the two cores for cooperation with the cores in the same manner previously described, the air gap between the armature and the core 41 being smaller than that between the armature and the core 40. The armature 42 is shown as being pivoted at 43 and arranged to actuate contacts 44 connected to control the circuit of the breaker closing coil 39.

The relay has an operating coil 45 disposed on the core 40 and having one end connected to phase A of the generator 35 and to phase A' of the line 36, preferably through resistors 46 and a two-pole switch 53. The other end of the coil 45 is connected to ground at 47. Thus, the coil 45 is connected to be energized in response to the sum of corresponding phase voltages of the line and of the generator, and its energization is a maximum when these voltages are in phase and a minimum when they are 180° out of phase, as previously explained in connection with the coil 13 of Fig. 1.

A restraining coil 48 is placed on the core 41 and connected to the direct current output of a full-wave rectifier bridge 49. The alternating current input terminals of the rectifier bridge 49 are connected to adjustable taps 50 on the resistors 46, so that the rectifier is energized in response to the difference between corresponding phase voltages of the generator and of the line, and the coil 48 is energized by a corresponding pulsating direct current. A capacitor 51 is connected across the restraining coil 48 in series with an adjustable resistor 52.

It will be seen that the operation of this relay is essentially the same as that of Fig. 1. Thus, the operating coil 45 tends to cause operation of the relay to close the contacts 44 when the voltages of the generator and of the line are in phase, or nearly in phase. The restraining coil 48, however, opposes operation of the armature 42, and since it acts through a much smaller air gap than the operating coil 45, it is relatively more effective. The restraining coil 48 is energized in response to the difference of corresponding phase voltages of the generator and line, so that its energization is a maximum when these voltages are 180° out of phase and a minimum when they are in phase. Thus, the coil 48 restrains operation of the relay until the phase angle difference is within the desired limits, and since its energization varies quite rapidly through the in-phase point, very accurate operation is obtained. The coil 48 also prevents operation of the relay if the magnitudes of the line and generator voltages differ by more than a predetermined amount, since the minimum restraining force will be sufficient to prevent operation of the relay if these voltages differ greatly.

The coil 48 itself, with the capacitor 51 connected across it, also acts to prevent operation if the frequency difference is too great, in essentially the same way as the coil 19 of Fig. 1. The pulsating flux in the core 41 induces a voltage in the coil 48 proportional to the rate of change of the flux, and since the frequency of pulsation depends on the frequency difference between the generator and the line, this induced voltage increases as the frequency difference increases. The capacitor 51 provides a low-impedance path for the relatively high-frequency current due to this voltage, and a restraining force is thus provided which is a function of the frequency difference between the line and generator. It will be apparent that similar operation could be obtained in the embodiment of Fig. 1 by proper choice of the capacitors 23 and 28, and the short-circuited coil 19 could thus be eliminated.

It will be seen that the relay of Fig. 2 is similar to that of Fig. 1 and operates in essentially the same manner, except that it does not prevent operation with incorrect phase sequence or an open phase lead. The relay of Fig. 2, however, is somewhat simpler and can be made very compact, and it is suitable for use in any application where protection against incorrect phase sequence or broken leads is unnecessary or can be provided by other means.

The devices of both embodiments of the invention can be made very accurate and are of relatively simple and inexpensive construction, so that they are very suitable for use in any system where the generators themselves are provided with control or regulating means for maintaining the voltage and frequency substantially constant. Certain preferred embodiments of the invention have been shown and described for the purpose of illustration, but it will be understood that various other embodiments and modifications are possible and are within the scope of the invention.

I claim as my invention:

1. A paralleling relay for controlling the connection of an alternating current generator to an energized alternating current line, said relay comprising contact means, an operating coil for effecting actuation of the contact means, means for energizing said operating coil in response to the sum of corresponding voltages of the generator and of the line, restraining coil means opposing actuation of the contact means, and means for energizing the restraining coil means in response to the difference of corresponding voltages of the generator and of the line, said restraining coil means including means for preventing actuation of the contact means when the frequency difference between the generator and the line exceeds a predetermined amount.

2. A paralleling relay for controlling the connection of an alternating current generator to an energized alternating current line, said relay comprising contact means, an operating coil for effecting actuation of the contact means, means for connecting said operating coil across corresponding voltages of the generator and of the line to be energized by the sum of said voltages, restraining coil means opposing actuation of the contact means, rectifier means connected to be energized by the difference of corresponding voltages of the generator and of the line, means for energizing the restraining coil means from the direct current output of said rectifier means, and said restraining coil means including means for preventing actuation of the contact means when the frequency difference between the generator and the line exceeds a predetermined amount.

3. A paralleling relay for controlling the connection of an alternating current generator to an energized alternating current line, said relay comprising first and second magnetic core structures, a movable armature member, contact means adapted to be actuated by movement of the armature member, said armature member being positioned for cooperation with both core structures and having a relatively large air gap with the first core structure and a substantially smaller air gap with the second core structure in the non-actuated position of the armature member, an operating coil on the first core structure for effecting movement of the armature member to actuate the contact means, means for energizing said operating coil in response to the sum of corresponding voltages of the generator and of the line, restraining coil means on the second core structure for restraining movement of the armature member, and means for energizing the restraining coil means in response to the difference of corresponding voltages of the generator and of the line.

4. A paralleling relay for controlling the connection of an alternating current generator to an energized alternating current line, said relay comprising first and second magnetic core structures, a movable armature member, contact means adapted to be actuated by movement of the armature member, said armature member being positioned for cooperation with both core structures and having a relatively large air gap with the first core structure and a substantially smaller air gap with the second core structure in the non-actuated position of the armature member, an operating coil on the first core structure for effecting movement of the armature member to actuate the contact means, means for energizing said operating coil in response to the sum of corresponding voltages of the generator and of the line, restraining coil means on the second core structure for restraining movement of the armature member, and means for energizing the restraining coil means in response to the difference of corresponding voltages of the generator and of the line, said restraining coil means including means for restraining movement of the armature member when the frequency difference between the generator and the line exceeds a predetermined amount.

5. A paralleling relay for controlling the connection of a three-phase alternating current generator to an energized three-phase line, said relay comprising contact means, an operating coil for effecting actuation of the contact means, means for connecting said operating coil to a first phase of the generator and to the corresponding phase of the line to be energized in response to the sum of the voltages of said phases, restraining coil means opposing actuation of the contact means, said restraining coil means including a first coil connected to be energized in response to the difference of the voltages of a second phase of the generator and of the corresponding phase of the line, a second coil connected to be energized in response to the difference of the voltages of the third phase of the generator and of the corresponding phase of the line, and means for preventing actuation of the contact means when the frequency difference between the generator and the line exceeds a predetermined amount.

6. A paralleling relay for controlling the connection of a three-phase alternating current generator to an energized three-phase line, said relay comprising first and second magnetic core structures, a movable armature member, contact means adapted to be actuated by movement of the armature member, said armature member being positioned for cooperation with both core structures and having a relatively large air gap with the first core structure and a substantially smaller air gap with the second core structure in the non-actuated position of the armature member, an operating coil on the first core structure for effecting movement of the armature member to actuate the contact means, means for energizing said operating coil in response to the sum of corresponding voltages of the generator and of the line, restraining coil means on the second core structure opposing movement of the armature member, said restraining coil means including a first coil connected to be energized in response to the difference of the voltages of a second phase of the generator and of the corresponding phase of the line, a second coil connected to be energized in response to the difference of the voltages of the third phase of the generator and of the corresponding phase of the line, and a third coil short-circuited through a rectifier device.

7. A paralleling relay for controlling the connection of a three-phase alternating current generator to an energized three-phase line, said relay comprising first and second magnetic core structures, a movable armature member, contact means adapted to be actuated by movement of the armature member, said armature member being positioned for cooperation with both core structures and having a relatively large air gap with the first core structure and a substantially smaller air gap with the second core structure in the non-actuated position of the armature member, an operating coil on the first core structure for effecting movement of the armature member to actuate the contact means, means for energizing said operating coil in response to the sum of corresponding voltages of the generator and of the line, first and second restraining coils on the second core structure opposing movement of the armature member, first rectifier means having alternating current input terminals connected to a second phase of the generator and to the corresponding phase of the line and having direct current output terminals connected to the first restraining coil, second rectifier means having alternating current input terminals connected to the third phase of the generator and to the corresponding phase of the line and having direct current output terminals connected to the second restraining coil, and a third restraining coil on the second core member short-circuited through a rectifier device.

8. A paralleling relay for controlling the connection of an alternating current generator to an energized alternating current line, said relay comprising contact means, an operating coil for effecting actuation of the contact means, means for connecting said operating coil to corresponding voltages of the generator and of the line to be energized in response to the sum of said voltages, a restraining coil opposing actuation of the contact means, rectifier means energized in response to the difference of said voltages, said restraining coil being connected to the direct current output of the rectifier means, and a capacitor connected across the restraining coil.

9. A paralleling relay for controlling the connection of an alternating current generator to an energized alternating current line, said relay comprising first and second magnetic core structures, a movable armature member, contact means adapted to be actuated by movement of the armature member, said armature member being positioned for cooperation with both core structures and having a relatively large air gap with the first core structure and a substantially smaller air gap with the second core structure in the non-actuated position of the armature member, an operating coil on the first core structure for effecting movement of the armature member to actuate the contact means, means for energizing said operating coil in response to the sum of corresponding voltages of the generator and of the line, a restraining coil on the second core structure opposing movement of the armature member, means for energizing said restraining coil in response to the difference of said voltages, and means for effectively energizing the restraining coil when the frequency difference between the generator and the line exceeds a predetermined amount.

10. A paralleling relay for controlling the connection of an alternating current generator to an energized alternating current line, said relay comprising first and second magnetic core structures, a movable armature member, contact means adapted to be actuated by movement of the armature member, said armature member being positioned for cooperation with both core structures and having a relatively large air gap with the first core structure and a substantially smaller air gap with the second core structure in the non-actuated position of the armature member, an operating coil on the first core structure for effecting movement of the armature member to actuate the contact means, means for energizing said operating coil in response to the sum of corresponding voltages of the generator and of the line, a restraining coil on the second core structure opposing movement of the armature member, rectifier means energized in response to the difference of said voltages, said restraining coil being connected to the direct current output of the rectifier means, and a capacitor connected across the restraining coil.

References Cited in the file of this patent
UNITED STATES PATENTS
Re. 16,540    Traver _____ Feb. 8, 1927